(12) United States Patent
Steiner et al.

(10) Patent No.: US 7,939,955 B2
(45) Date of Patent: May 10, 2011

(54) METHOD FOR OPERATING A WIND ENERGY INSTALLATION AND A WIND ENERGY INSTALLATION

(75) Inventors: Stefan Steiner, Flensburg (DE); Martin Von Mutius, Ascheffel (DE)

(73) Assignee: Repower Systems AG, Hamburg (DE)

( * ) Notice: Subject to any disclaimer, the term of this patent is extended or adjusted under 35 U.S.C. 154(b) by 559 days.

(21) Appl. No.: 12/160,511

(22) PCT Filed: Jan. 4, 2007

(86) PCT No.: PCT/EP2007/000045
§ 371 (c)(1),
(2), (4) Date: Jul. 10, 2008

(87) PCT Pub. No.: WO2007/082642
PCT Pub. Date: Jul. 26, 2007

(65) Prior Publication Data
US 2009/0295161 A1 Dec. 3, 2009

(30) Foreign Application Priority Data
Jan. 11, 2006 (DE) .......................... 10 2006 001 613

(51) Int. Cl.
*F03D 7/04* (2006.01)
*H02P 9/04* (2006.01)
(52) U.S. Cl. ............................... 290/44; 290/55; 322/37
(58) Field of Classification Search ................ 290/7, 43, 290/44, 54, 55; 322/29, 37
See application file for complete search history.

(56) References Cited

U.S. PATENT DOCUMENTS
7,231,282 B2 * 6/2007 Schubert et al. .............. 700/287
(Continued)

FOREIGN PATENT DOCUMENTS
DE 19626402 C1 7/1997
(Continued)

OTHER PUBLICATIONS

Heier, Siegfried; Windkraftanlagen: Systemauslegung, Netzintegration und Regelung; 4th Edition, B.G. Teubner, Stuttgart, Leipzig, Wiesbaden, Germany; Feb. 2005.

(Continued)

*Primary Examiner* — Nicholas Ponomarenko
(74) *Attorney, Agent, or Firm* — Rankin, Hill & Clark LLP (57) ABSTRACT

The invention relates to a method for operating a wind energy installation (10), in which the wind energy installation (10) has a rotor (12, 13, 22), at least one rotor blade (14) with an adjustable angle, a mechanical brake device (19) for braking the rotor (14), an operational control device (15, 15') and a safety system (16, 20). The invention also relates to a corresponding wind energy installation (10). The method according to the invention is defined by the following method steps: braking of the rotor (12, 13, 22) by means of an angular adjustment (28) with an average angular adjustment rate of less than 8.5°/s of the at least one rotor blade (14) after a fault signal (30) occurs, braking of the rotor (12, 13, 22) by means of the mechanical brake device (19) as soon as the rotational speed of the rotor (12, 13, 22) exceeds a predefinable first rotational speed limit, and triggering of the safety system (16, 20) as soon as the rotational speed of the rotor (12, 13, 22) exceeds a predefinable second rotational speed limit.

36 Claims, 4 Drawing Sheets

U.S. PATENT DOCUMENTS

| | | | |
|---|---|---|---|
| 7,355,294 B2 * | 4/2008 | Teichmann | 290/44 |
| 7,709,972 B2 * | 5/2010 | Arinaga et al. | 290/55 |
| 7,763,989 B2 * | 7/2010 | Kinzie et al. | 290/44 |
| 7,816,798 B2 * | 10/2010 | Hehenberger | 290/44 |
| 2003/0127862 A1 | 7/2003 | Weitkamp | |
| 2007/0018457 A1 | 1/2007 | Llorente Gonzalez | |
| 2007/0216166 A1 | 9/2007 | Schubert | |
| 2008/0078228 A1 * | 4/2008 | Nies | 73/1.01 |
| 2009/0224543 A1 * | 9/2009 | Steudel et al. | 290/44 |
| 2009/0261588 A1 * | 10/2009 | Von Mutius et al. | 290/44 |
| 2010/0133823 A1 * | 6/2010 | Schramm et al. | 290/44 |
| 2010/0207396 A1 * | 8/2010 | Simon | 290/55 |

FOREIGN PATENT DOCUMENTS

| | | |
|---|---|---|
| DE | 19717059 C1 | 7/1998 |
| DE | 19811952 A1 | 9/1999 |
| DE | 10058076 A1 | 6/2002 |
| DE | 102004054608 A1 | 3/2006 |
| WO | 02/42641 A1 | 5/2002 |
| WO | 2005/116445 A1 | 12/2005 |

OTHER PUBLICATIONS

Burton, Tony et al.; Wind Energy Handbook; Nov. 2002; pp. 214-218; 473-474; John Wiley and Sons Ltd.; West Sussex, England.

* cited by examiner

Fig. 4a  Wind-speed [m/s]

Fig. 4b  Pitch-rate [deg/s]

Fig. 4c  Rotational speed [rpm]

Fig. 4d  Electrical power [kW]

Fig. 4e  Braking moment [kNm]

Fig. 4f  Tower foot bending moment [kNm]

Fig. 4g  Rotor-torque [kNm]

Time [s]

METHOD FOR OPERATING A WIND ENERGY INSTALLATION AND A WIND ENERGY INSTALLATION

BACKGROUND OF THE INVENTION

1. Field of the Invention

The invention relates to a method for operating a wind energy installation, the wind energy installation including a rotor, at least one rotor blade with an adjustable angle, a mechanical brake device for braking the rotor and an operational control device as well as a safety system. The invention further relates to a wind energy installation including a rotor, at least one rotor blade with an adjustable angle, a mechanical brake for braking the rotor, an operational control device and a safety system. According to the invention, a wind energy installation also is a wind power plant.

2. Description of Related Art

Methods for operating a wind energy installation and wind energy installations are known per se. To this end, reference is made, for example, to the textbook, "Windkraft Systemauslegung, Netzintegration und Regelung", Siegfried Heier, 4th Edition, B. G. Teubner, February 2005. The operation of wind energy installations and wind energy installations themselves are critical with regard to the design thereof, in particular with regard to safety aspects. In particular in strong winds associated with grid failure, in which the aerodynamic torque produced by the wind in the rotor encounters no resistance through the generator, it may lead to extreme tower loads, in particular tower foot bending moments, uncontrolled blade angle adjustments or pitching and possibly even the triggering of a safety chain. As a result of grid failure and/or more generally as a result of load shedding by the generator, the rotor starts to accelerate in strong wind until the braking system of the wind energy installation starts to brake the rotor. Depending on the strength of the braking power, loads of different intensity are produced on the wind energy installation.

BRIEF SUMMARY OF THE INVENTION

It is the object of the present invention to provide a reliable method for operating a wind energy installation and a correspondingly safe wind energy installation with reduced extreme loads.

This object is achieved by a method for operating a wind energy installation, the wind energy installation comprising a rotor, at least one rotor blade with an adjustable angle, a mechanical brake device for braking the rotor and an operational control device as well as a safety system, comprising the following method steps:
braking of the rotor by means of an angular adjustment at an average angular adjustment rate of less than 8.5°/s of the at least one rotor blade after a fault signal occurs,
braking of the rotor by means of the mechanical brake device as soon as the rotational speed of the rotor exceeds a predefinable first rotational speed limit, and
triggering of the safety system as soon as the rotational speed of the rotor exceeds a predefinable second rotational speed limit, the rotor being braked and the second rotational speed limit being higher than the first rotational speed limit, the second rotational speed limit not being exceeded when the wind energy installation is operationally capable, even in the event of load shedding by the generator combined with an extreme gust of wind, the probability of occurrence thereof being less than once in three months. According to the invention, an angular adjustment also means pitching throughout the description and the claims. Accordingly, an angular adjustment rate is also a pitch rate.

As a result of the method according to the invention, it is possible even in the event of extreme gusts of wind and with simultaneous load shedding by the generator, to operate the wind energy installation such that loads which are too high are not produced, for example by a tower foot bending moment or a rotor bending moment.

In particular, the combination of the braking of the rotor by means of an angular adjustment at an average angular adjustment rate of less than 8.5°/s and the braking of the rotor by means of the mechanical brake device, as soon as the rotational speed of the rotor exceeds a predefinable first rotational speed limit, combined with the further features, leads to the result according to the invention. The low angular adjustment rate serves, in particular, for preventing the rotor blades from being rotated too rapidly, so that an undesired reverse thrust is prevented. The underlying recognition of the invention is that an angular adjustment rate which is as slow as possible for braking the rotor reduces the loads. The drawback with the risk of the overspeed of the rotor in the event of unpredictable gusts of wind may be reliably controlled by the additional measures according to the invention (first and second rotational speed limits). In the prior art, such low angular adjustment rates in the event of malfunction, such as for example drop in load, have hitherto been disregarded, as the overspeed conditions occurring during gusts have led to unacceptably high loads.

Within the scope of the invention, an averaged angular adjustment rate, in particular, means an averaging of the angular adjustment rate over the time period in which the braking takes place via an angular adjustment, in particular as long as the mechanical brake device does not brake the rotor. Preferably, the angular adjustment rate for braking the rotor by means of an angular adjustment is not only on average less than 8.5°/s, but permanently below 8.5°/s.

Preferably, the mechanical brake device in a wind energy installation acts by means of gears on the rapidly rotating side of the drive train. On this side the generator is also located with its rotating part denoted as the rotor. The mechanical brake device may, however, also be arranged on the low speed side of the drive train, i.e. on the side between the gears and the rotor blades. The wind energy installation may, however, also be designed to be gearless, so that the brake acts in the region of the rotor hub or the generator rotor. Within the scope of the invention, the term "rotor" also encompasses the terms "drive train", "high speed shaft", "generator rotor", "gears", "rotor shaft (=low speed shaft), "rotor hub" and "rotor blades". A braking of the rotor means, in particular, the braking of the drive train.

The braking of the rotor by means of an angular adjustment may take place additionally, or as an alternative, to braking the rotor by means of the mechanical brake device. Initially, an alternative braking of the rotor may also take place via an angular adjustment and subsequently both braking variants may be carried out, namely by means of the angular adjustment and by means of the mechanical brake device.

After triggering the safety system, the rotor may, in particular preferably, be braked by overriding the operational control device. The operational control device may, however, also be part of the safety system, and/or the safety system may be part of the operational control device, so that the operational control device does not necessarily have to be overridden for braking after triggering the safety system.

The form and strength of a gust of wind may be calculated by a normal wind profile model, as for example is indicated in the textbook, "Wind Energy Handbook", Tony Burton, David Sharpe, Nick Jenkins, Ervin Bossanyi, John Wiley and Sons Ltd, November 2002, on pages 214 to 218. In particular the formula (5.1) is of relevance here, for the case according to the invention of the probability of occurrence of less than once in three months a factor β of approximately 4.6 being able to be set. For the sake of simplicity, 10 s is set as the time period of the extreme gust of wind (described in this document as "gust"). For the design of a wind energy installation and the level of the first and second rotational speed limits, according to the location of the wind energy installation, predefined and/or predefinable load cases are assumed which have to be able to be supported during operation of the wind energy installation and/or by the wind energy installation without damage thereto. For example, Germanischer Lloyd and/or other corresponding safety institutes define such load cases. According to the definition of the load cases, corresponding computer programs which, for example, correspond to the "Flex" computer program from Stig Oye and/or have been derived and/or developed therefrom, are used to simulate wind energy installations and the operation of wind energy installations and to establish, depending on the load case, which loads may occur on the wind energy installation during operation. These loads will generally occur with predetermined probabilities. For example, in the document "Wind Energy Handbook" by Tony Burton et al. which has been mentioned above, in the "load case 1.5" on page 216 to page 218 an annual gust, i.e. an extremely strong gust which occurs with a probability of once a year, is assumed.

The object is further achieved by a method for operating a wind energy installation, the wind energy installation comprising a rotor, at least one rotor blade with an adjustable angle, a mechanical brake device for braking the rotor, an operational control device and a safety system, comprising the following method steps:

braking of the rotor by means of an angular adjustment at an average angular adjustment rate of less than 8.5°/s of the at least one rotor blade after a fault signal occurs,     braking of the rotor by means of the mechanical brake device as soon as the rotational speed of the rotor exceeds a predefinable first rotational speed limit, and the mechanical braking is triggered by the operational control device,     triggering of the safety system, as soon as the rotational speed of the rotor exceeds a predefinable second rotational speed limit, the rotor being braked and the second rotational speed limit being higher than the first rotational speed limit.

Preferably, the second rotational speed limit in the event of a wind gust with a probability of occurrence of once a year is not exceeded. For example, Germanischer Lloyd indicates that in the event of a predetermined load case, such as for example the occurrence of an "annual gust", i.e. an extreme gust of wind which occurs with a probability of occurrence of once a year, and namely at the corresponding location of the wind energy installation, certain loads in the rotor, for example, may not be exceeded and/or the occurring loads have to have a defined safety level in comparison with and/or with regard to the maximum occurring loads.

Setting the second rotational speed limit so that it is not exceeded in the event of an annual gust, has the advantage relative to the setting for a three monthly gust, that the brake is considerably less frequently applied and the wear of the brake and the entire drive train is therefore reduced.

Preferably the fault signal includes exceeding a third rotational speed limit which is lower than the first rotational speed limit, load shedding by the generator, an error in the grid and/or an error in the angular adjustment of at least one rotor blade.

An even more reliable operation is possible if the angular adjustment rate of the at least one rotor blade after the occurrence of the fault signal is less than 8°/s, in particular preferably less than 6.5°/s and in particular preferably less than 4.6°/s, in particular less than 4.5°/s. These values may be regarded as average values and/or as actual values without averaging. The angular adjustment rate is expediently controlled by a control device associated with the operational control device or a separate control device. In this case, the operational control device predetermines the angular adjustment rate and the control device thus controls the angular adjustment rate and/or the adjustment of the angle of the respective rotor blade.

Preferably, the angular adjustment rate of the at least one rotor blade when exceeding a predefinable blade angle is altered to a low angular adjustment rate, in particular to an angular adjustment rate which is less than half, in particular less than a quarter of the previous angular adjustment rate.

When the fault signal occurs, based on the existing blade angle position of the rotor blade, the blade angle is rotated at the angular adjustment rate according to the invention in the direction of the feathering position. In this case, the initial point may be a zero position of the rotor blade. However, a position may also be present which already is advanced in the direction of the feathering position. The zero position is preferably the rotor blade position at which during operation at optimal speed the maximum power may be achieved, frequently also denoted as the operating position. The feathering position is preferably the position in which no power may be produced. The rotor blades are in this case, in the manner of a vane, rotated out of the wind.

Preferably, the first rotational speed limit is in a range of more than 15% above a rated speed of the wind energy installation, which in particular has a rated power of more than 1.45 MW. The rated speed is, within the scope of the invention, a rotational speed at which the wind energy installation first achieves a rated power. The corresponding wind speed is, thus, known as rated wind speed. In particular with wind energy installations in which at high wind speeds above the rated wind speed the operating speed is reduced, the term "rated speed" may also refer to the reduced operating speed at the respective operating point. A rated speed, for example in a wind energy installation with a rated power of 1.5 MW, may be 1,800 revolutions per minute (rpm). This rated speed is measured on the rotor of the generator or on the high speed shaft of the gear box. A further rated speed may, however, also be defined, namely that which prevails on the rotor hub and/or which prevails in the generator, when no gear box is present. These corresponding rated speeds may preferably be in the range of 5 to 20 revolutions per minute, in particular preferably at 8 to 18 revolutions per minute. By rated power, is understood the maximum continuous power of the wind energy installation, i.e. the power at which there is approximately an optimum amount of power obtained, with simultaneously the lowest possible wear on the wind energy installation. The rated power is, in particular with offshore wind energy installations, in particular at high wind locations, the power at which the wind energy installation generates the greatest total power over the entire service life.

Preferably, the first rotational speed limit is between 20 and 35%, in particular between 22 and 28% above the rated speed of the wind energy installation. Particularly preferred is a value approximately 25% above the rated speed of the wind energy installation.

The second rotational speed limit is preferably in a range of 35% to 45% above a rated speed of the wind energy installation which, in particular, has a rated power of more than 1.45 MW. This second rotational speed limit, at the exceeding of which the safety system is triggered, is above the rotational speed limit which was hitherto usual for installations greater than 1.45 MW in the prior art. With smaller and, thus, less sluggish and load-critical installations (for example 600 kW) this rotational speed limit may be set higher.

Preferably, the second rotational speed limit is in a range of 5% to 20% above the first rotational speed limit of the wind energy installation, the low range in particular being advantageous with very rigid, for example gearless drive trains, as no torsional vibrations occur there.

Particularly preferably, the third rotational speed limit is in the range of 10 to 20%, in particular from 15 to 17% above a rated speed of a wind energy installation, which in particular has a rated power of more than 1.45 MW. The third rotational speed limit is relatively low. This means that braking the wind energy installation via the aerodynamic brake, by adjusting the angle of the at least one rotor blade by a relatively low angular adjustment rate, already begins at a relatively low rotational speed limit.

Preferably, the braking of the rotor by means of the mechanical brake device is terminated when a fourth predefinable rotational speed limit is fallen below. This preferably occurs when the wind energy installation is in a safe installation state, the extreme load case being therefore at an end.

When the braking of the rotor by means of the mechanical brake device is terminated, when an average rotor blade angle exceeds a predefinable threshold value and a predefinable time since the start of the braking of the rotor by means of the mechanical brake device (19) is exceeded, a protective and safe operation in particular of the mechanical brake device is possible. In particular, therefore, dangerous overheating of the brake is avoided.

The object is further achieved by a method for operating a wind energy installation, the wind energy installation comprising a rotor, at least one rotor blade with an adjustable angle, a tower, an operational control device and a safety system, comprising the following method steps:

operation of the wind energy installation regulated or controlled by the operational control device for generating electrical voltage until a fault signal occurs, triggering of the safety system when the fault signal occurs and subsequent braking of the rotor via an angular adjustment at an, in particular initial, average angular adjustment rate of less than 6.5°/s of the at least one rotor blade, detected over a time period of a half, up to a whole, vibration period of the tower.

Preferably, the average angular adjustment rate is less than 6°/s, in particular less than 5°/s, in particular less than 4.6°/s, in particular less than 4.5°/s.

Preferably, the angular adjustment rate is controlled or regulated and is further reduced with increasing enlargement of the blade angle and/or a reduction of the rotational speed.

Preferably, the fault signal in the event of load shedding by a generator is coupled to an extreme gust of wind, the probability of occurrence of the gust of wind being less than once in three months, in particular less than once a year.

The object is further achieved by a wind energy installation comprising a rotor, at least one rotor blade with an adjustable angle, a mechanical brake for braking the rotor, an operational control device and a safety system, a first brake device being provided which brakes the rotor via an angular adjustment of the at least one rotor blade at an average angular adjustment rate of less than 8.5% in the presence of a fault signal, a second brake device being provided for the mechanical braking of the rotor, as soon as the rotational speed of the rotor exceeds a predefinable first rotational speed limit, the safety system in the case in which the rotational speed of the rotor exceeds a predefinable second rotational speed limit, being provided for braking the rotor, the second rotational speed limit being higher than the first rotational speed limit, the second rotational speed limit and the wind energy installation being dimensioned such that when the wind energy installation is operationally capable, even in the event of load shedding by the generator combined with an extreme gust of wind, the probability of occurrence thereof being less than once in three months, the second rotational speed limit is not exceeded.

Within the scope of the invention, "the presence of a fault signal" in particular also means "in the event of the occurrence of a fault signal".

The object is further achieved by a wind energy installation comprising a rotor, at least one rotor blade with an adjustable angle, a mechanical brake for braking the rotor, an operational control device and a safety system, a first brake device being provided which brakes the rotor by means of an angular adjustment of the at least one rotor blade at an average angular adjustment rate of less than 8.5% in the presence of a fault signal, a second brake device being provided for the mechanical braking of the rotor, as soon as the rotational speed of the rotor exceeds a predefinable first rotational speed limit, the second brake device being able to be triggered by the operational control device, the safety system in the case in which the rotational speed of the rotor exceeds a predefinable second rotational speed limit, being provided for braking the rotor, the second rotational speed limit being higher than the first rotational speed limit.

Preferably, the second rotational speed limit, in the event of a gust of wind with a probability of occurrence of once a year, is not exceeded. This means, in particular, that the probability of occurrence of such a load is so small that it may be detected at a relatively low level of safety.

Preferably, the fault signal includes exceeding a third rotational speed limit which is lower than the first rotational speed limit, load shedding by the generator, an error in the grid and/or an error in the angular adjustment of at least one rotor blade. Preferably, the angular adjustment rate of the at least one rotor blade in the presence of the fault signal is less than 8°/s, in particular less than 6.5°/s, in particular less than 4.6°/s, in particular less than 4.5°/s. The angular adjustment rate is preferably able to be controlled by a control device associated with the operational control device or a separate control device. The angular adjustment rate of the at least one rotor blade is expediently able to be altered, when exceeding a predefinable blade angle, to a lower angular adjustment rate, in particular to an angular adjustment rate which is less than half, in particular less than a quarter of the previous angular adjustment rate. Alternatively to the control by the control device, the reduction of the adjustment rate may also take place by a suitable hardware arrangement, for example staged battery packs for supplying energy to the actuating drives.

The first rotational speed limit is preferably in a range of more than 15% above a rated speed of the wind energy installation, which in particular has a rated power of more than 1.45 MW. At a rated speed of 1,800 revolutions per minute, the first rotational speed limit is then preferably in a range of more than 2,070 revolutions per minute and in particular preferably in a range of more than 2,160 revolutions per minute. Preferably, the first rotational speed limit is between 20 and 35%, in particular between 22 and 28% above the rated speed of the wind energy installation. This corresponds with a rated speed of 1,800 to a range between 2,160 and 2,430, in particular a range of 2,196 to 2,304 revolutions per minute.

Preferably, the second rotational speed limit is in a range of 35% to 45% above a rated speed of the wind energy installation which, in particular, has a rated power of more than 1.45 MW. At a rated speed of 1,800 revolutions per minute, this corresponds to a range of 2,430 revolutions per minute to 2,610 revolutions per minute.

Preferably, the second rotational speed limit is in a range of 5% to 20% above the first rotational speed limit of the wind energy installation. This is at a first rotational speed limit of 2,200 revolutions per minute, from 2,310 to 2,640 revolutions per minute.

Preferably, the third rotational speed limit is in a range of 10% to 20%, in particular of 15% to 17%, above a rated speed of the wind energy installation which, in particular, has a rated power of more than 1.45 MW. This is at a rated speed of 1,800 revolutions per minute, in a range of 1,980 to 2,160 revolutions per minute, in particular in a range of 2,070 to 2,106 revolutions per minute. Preferably, the braking of the rotor by means of the mechanical brake device may be terminated when falling below a fourth predefinable rotational speed limit, for example at a rated speed. Moreover, preferably the braking of the rotor by means of the mechanical brake device may be terminated, when an average rotor blade angle exceeds a predefinable threshold value and a predefinable time since the start of the braking of the rotor by means of the mechanical brake device is exceeded.

The object is further achieved by a wind energy installation comprising a rotor, at least one rotor blade with an adjustable angle, a tower, in particular preferably a mechanical brake for braking the rotor, an operational control device and a safety system, the operational control device being provided for the regulated or controlled operation of the wind energy installation for generating electrical voltage until a fault signal occurs, the safety system being able to be triggered with and/or after the occurrence of the fault signal and by means of the safety system a braking of the rotor being produced by means of an angular adjustment at an, in particular initial, average angular adjustment rate of less than 6.5°/s of the at least one rotor blade detected over a time period of a half to a whole vibration period of the tower.

The recognition underlying the invention is that excessive excitation of tower vibration by negative rotor thrust may be counteracted, when at least for a duration of a half vibration period of the tower, advantageously however for the duration of a whole vibration period, the initial angular adjustment rate is restricted after the fault signal to low values below 6.5°/s. Conventional natural frequencies of the tower are currently between 0.2-0.4 Hz, i.e. a vibration period is between 2.5 and 5 seconds. Thus, with a stiff tower the adjustment rate may be restricted to the aforementioned value for at least 1.3 seconds after triggering the fault signal, and with a soft tower for 2.5 seconds to the aforementioned value. It is substantially more efficient, however, to carry out the restriction for approximately 2.5 and/or 5 seconds, in order to avoid as far as possible an activation of the first stress cycle of the tower after the fault signal. With larger installations in the future, with lower natural frequencies to be expected, the ratios are naturally able to be accordingly adapted.

Preferably the average angular adjustment rate is less than 6°/s, in particular less than 5°/s, in particular less than 4.5°/s.

Preferably the angular adjustment rate may be controlled or regulated and may be further reduced with increasing enlargement of the blade angle and/or reduction of the rotational speed.

Preferably, the fault signal in the event of load shedding by a generator is coupled to an extreme gust of wind, the probability of occurrence of the gust of wind being less than once in three months, in particular less than once a year.

The object is further achieved by a method for operating a wind energy installation, the wind energy installation comprising a rotor, at least one rotor blade with an adjustable angle, a mechanical brake device for braking the rotor, an operational control device and a safety system, comprising the following method steps:

braking of the rotor by means of an angular adjustment at an average angular adjustment rate of less than 6.5°/s of the at least one rotor blade after a fault signal occurs, braking of the rotor by means of the mechanical brake device as soon as the rotational speed of the rotor exceeds a predefinable first rotational speed limit, and triggering of the safety system, as soon as the rotational speed of the rotor exceeds a predefinable second rotational speed limit, the second rotational speed limit being higher than the first rotational speed limit and the first rotational speed limit being in a range of more than 15% above a rated speed of the wind energy installation, which in particular has a rated power of more than 1.45 MW.

Preferably, the first rotational speed limit is between 20 and 35%, in particular between 22 and 28%, above the rated speed of the wind energy installation. Moreover, preferably the second rotational speed limit is in a range of 35% to 45% above a rated speed of the wind energy installation, which in particular has a rated power of more than 1.45 MW. Preferably, the fault signal has a third rotational speed limit which is in a range of 10% to 20%, in particular 15% to 17%, above a rated speed of the wind energy installation.

Accordingly, the object is achieved by a wind energy installation which comprises a rotor, at least one rotor blade with an adjustable angle, a mechanical brake for braking the rotor, an operational control device and a safety device, a first brake device being provided which brakes the rotor by means of an angular adjustment of the at least one rotor blade at an average angular adjustment rate of less than 6.5°/s in the presence of a fault signal, a second brake device being provided for the mechanical braking of the rotor, as soon as the rotational speed of the rotor exceeds a predefinable first rotational speed limit, the safety system in the case in which the rotational speed of the rotor exceeds a predefinable second rotational speed limit, being provided for braking the rotor, the second rotational speed limit being higher than the first rotational speed limit, the first rotational speed limit being in a range of more than 15% above a rated speed of the wind energy installation, which in particular has a rated power of more than 1.45 MW. The further preferred features of the wind energy installation according to the invention result from that which has been disclosed above.

The invention is disclosed hereinafter, without restricting the general inventive idea, with reference to embodiments by referring to the drawings, with regard to all details according to the invention not described in more detail reference is expressly made to the drawings.

BRIEF DESCRIPTION OF THE DRAWINGS

FIG. 3 shows schematic diagrams for two different load cases, which occur in a wind energy installation according to the invention, namely FIG. 4 shows schematic diagrams of values of two wind energy installations, which are on the one hand (solid lines) according to the invention and on the other hand (dotted lines) according to the prior art.

DETAILED DESCRIPTION OF THE INVENTION

In the following Figs., the same or similar elements and/or corresponding parts are respectively provided with the same reference numerals, so that a corresponding further representation may be dispensed with.

Figure 1:
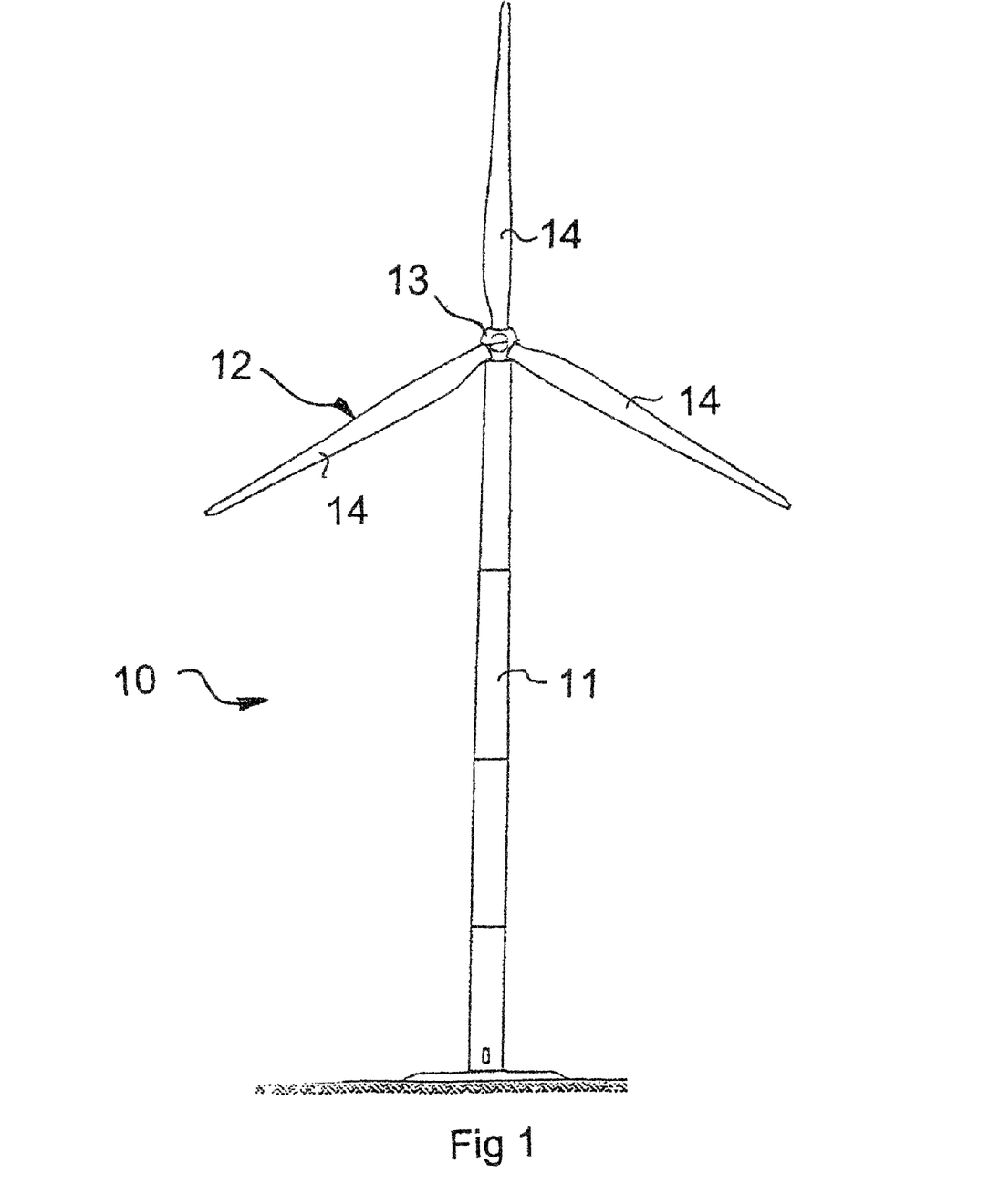
FIG. 1 shows a schematic view of a wind energy installation.

FIG. 1 shows a schematic representation of a wind energy installation 10. The wind energy installation 10 comprises a tower 11 and a rotor 12 which comprises three rotor blades 14 which are attached to a rotor hub 13. In the event of wind, the rotor 12 rotates in a manner known per se. As a result, power from a generator connected to the rotor 12 and/or to the rotor hub 13 may be generated and discharged to a consumer network.

Figure 2:
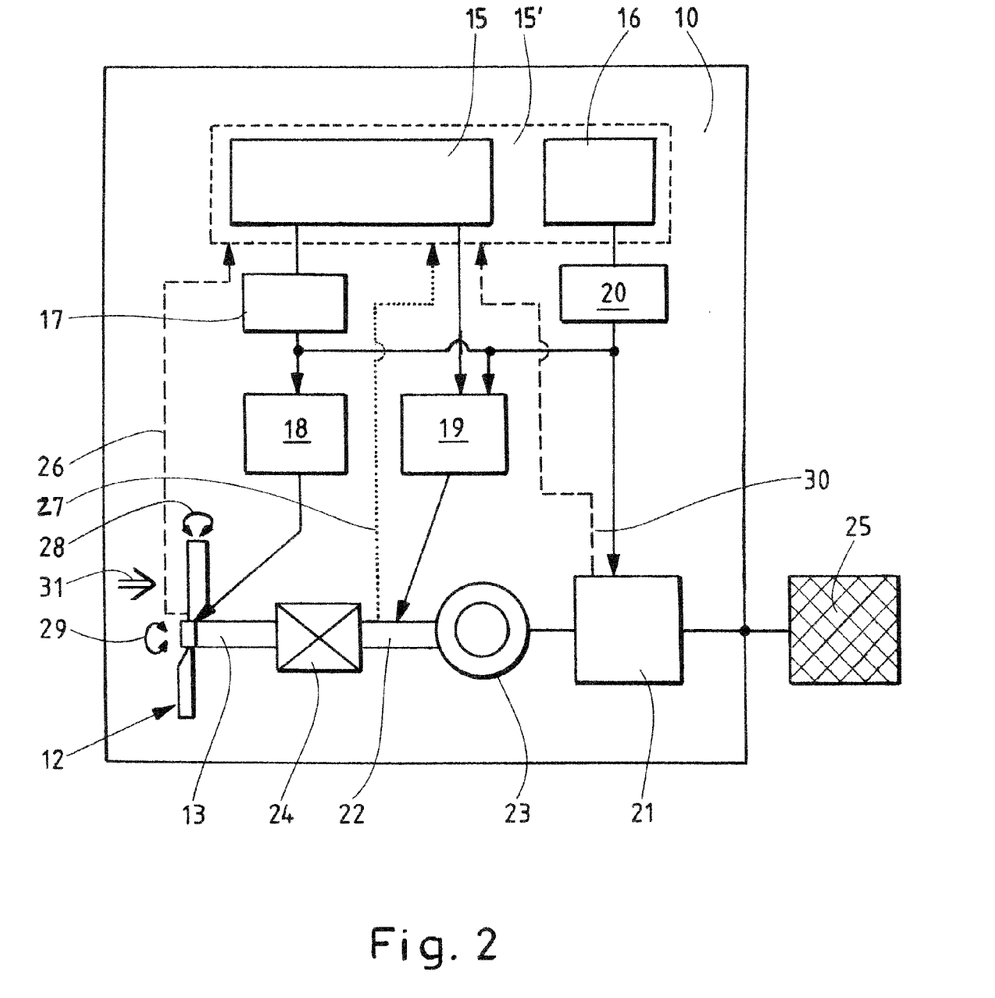
FIG. 2 shows a schematic block diagram of essential components of a wind energy installation.

FIG. 2 schematically shows essential components of the wind energy installation 10 according to the invention. An operational control 15 which also may be denoted as an operational control device or operational control system, controls and/or regulates the operation of the wind energy installation 10. Adjacent to the operational control 15 is a safety monitoring device 16 which is connected to a safety chain 20. The safety chain 20 comprises, for example, a vibration detector, a manual (emergency) switch and a rotational speed relay. The safety chain 20 is used in the presence of an event relevant to safety, for example vibrations which are too great or the actuation of the emergency switch by an operating person, so that the wind energy installation is decelerated into an uncritical state. The safety chain 20 may be designed as a hardware chain. When the safety chain 20 is triggered, which is indicated by the arrow to the electrical components 21, the generator 23 is disconnected from the grid 25 and the rotor shaft 9 and/or the high speed shaft 22 braked, for example via the blade adjustment 18 and/or the mechanical brake 19 or even, which is not shown, directly by overriding one or more regulating or control devices such as the blade adjustment 19. The safety monitoring device 16 may also be designed such that said safety monitoring device monitors the operational control 15 for functionality. The safety monitoring device 16 is preferably designed in this respect as a type of "watch dog". The operational control 15', as shown in dotted lines, may also comprise the safety monitoring device 16. The operational control 15' therefore has integrated safety monitoring 16.

The operational control 15,15' is connected via corresponding electronic data lines to a controller 17 and the blade adjustment 18, and moreover to the mechanical brake 19. By the term "blade adjustment" 18 is understood, in particular, an actuator which ensures a blade adjustment of the rotor blades 14. Accordingly, by the term "mechanical brake" 19 is understood an actuator which ensures that the mechanical brake 19 acts in this embodiment on the high speed shaft 22. The mechanical brake 19 may also act on the rotor shaft 9 which is, however, not shown.

A data connection is denoted at 26 which supplies a rotor blade angle and/or the rotor blade angle of the rotor blades 14 to the operational control 15 and/or 15'. A data connection is shown by the reference numeral 27 which supplies an actual rotational speed of the high speed shaft 22 to the operational control 15 and/or 15'. A data line is denoted at 30 which supplies a fault signal, which in this embodiment is based on electrical components 21, to the operational control 15 and/or 15'.

The operation of the wind energy installation is as follows. In the event of wind, the rotor 12 is rotated according to the rotational direction 29. As a result, the rotor shaft 9 also rotates which rotates the high speed shaft 22 by means of a gear box 24 in a ratio of, for example, 1:100. As a result, in the generator 23 an electrical voltage is generated which is controlled, converted and/or changed into alternating current in the electrical components 21. At the output of the electrical components 21 a connection to the grid 25 is provided by which the consumer is supplied with voltage and/or electrical power. Generally known designs for regulating and controlling wind energy installations are, for example, disclosed in chapter 5 of the textbook, ""Windkraft Systemauslegung, Netzintegration und Regelung" by Siegfried Heier, which is cited above.

In the event of an extreme gust of wind 31 it may arise in combination with load shedding by the generator, i.e. in particular an abrupt loss of the grid load, for example by a failure of a converter, a generator, a transformer, a grid failure or the triggering of a safety chain, such that the rotational speed of the rotor and/or the generator reaches very critical and high rotational speeds, so that sudden braking is necessary which may lead to considerable fatigue of the material of the wind energy installation or to damage.

The invention works counter thereto, because the rotor 12 and/or the rotor shaft 9 and/or accordingly the high speed shaft 22 is braked over a relatively slow angular adjustment 28 even when a corresponding fault signal occurs, for example even when a relatively low third rotational speed limit is exceeded. As a result of the relatively low angular adjustment rate or pitch rate of less than 8.5°/s, in particular less than 6.5°/s, load-free braking is initiated.

If this braking due to the strength of the gust of wind 31 is not sufficient and if the rotational speed of the rotor, which within the scope of the invention also encompasses the terms drive train and generator rotor, exceeds a predefinable first rotational speed limit which is higher than the third rotational speed limit, the mechanical brake 19 is initiated via the braking program according to the invention by means of the operational control 15 and/or 15'. Only when both braking variants, namely the aerodynamic braking by means of the blade adjustment 18 and the mechanical braking by means of the mechanical brake 19 are not sufficient, and the gust of wind 31 is sufficiently strong that a second rotational speed limit is exceeded, is the safety system 16, 20 triggered.

The safety system 16, 20 causes a triggering of the brake devices which are not required for the operational control and possibly an even stronger braking effect, for example a blade adjustment with a greater angular adjustment rate and/or an application of a hydraulic brake with greater hydraulic pressure. The second rotational speed limit is, however, set such that said rotational speed limit is achieved, even in the event of load shedding by the generator, only in the event of such extreme gusts of wind which occur with a probability of less than once in three months. In this particular embodiment, a gust of wind which has a probability of occurrence of less than once a year, is assumed. A simple embodiment of a safety system which may be easily used which comprises a safety monitoring device 16 and a safety chain 20, is for example disclosed on pages 473 and 474 of the publication "Wind Energy Handbook" which has been mentioned above.

Figure 3A:
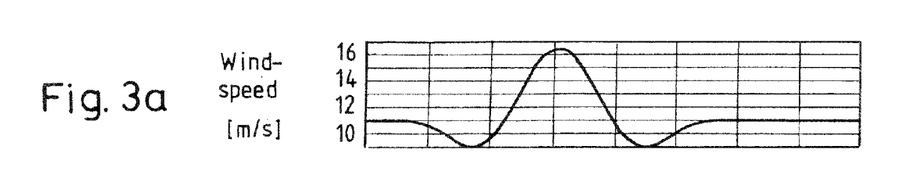
FIG. 3a shows the wind speed over the time of a calculated annual gust.
Figure 3B:
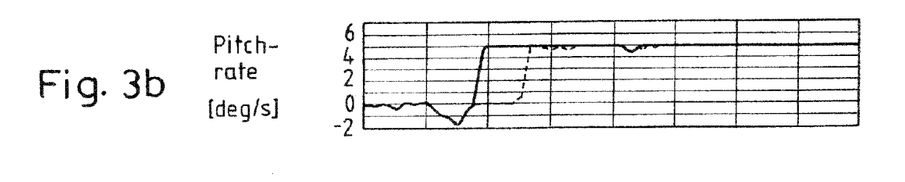
FIG. 3b shows the angular adjustment rate over the time.
Figure 3C:
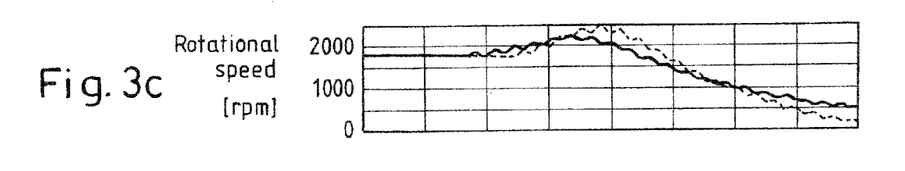
FIG. 3c shows the rotational speed over the time.
Figure 3D:
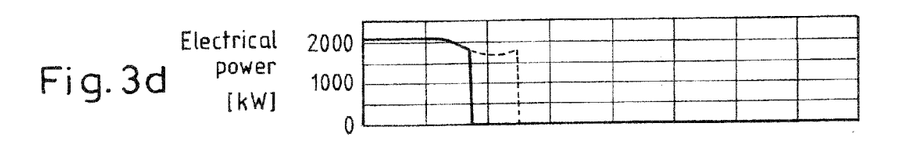
FIG. 3d shows the electrical power over the time.

In FIGS. 3a to 3g, diagrams are shown by means of which the invention is to be explained for two different load cases. FIG. 3a shows a diagram of the wind speed over the time, in this case a conventional extreme operating gust being shown, which for example may be calculated in the formula 5.1 on page 215 of the document "Wind Energy Handbook" which is cited in more detail above. It refers to a gust which at the location considered occurs with a probability of precisely once a year. FIG. 3d shows a diagram of the electrical power in kW over the time, two cases being shown, namely the first case in which at approximately 7.5 seconds load shedding occurs, namely at the lowest point of the gust and in comparison thereto at approximately 9 seconds, which corresponds to a position which may be identified approximately in the center of the rising flank of the gust from FIG. 3a. The second case is the case which is more critical for the wind energy installation and shown in dotted lines. For the safe design of a wind energy installation, the load shedding has to be able to occur at any time without a dangerous situation arising.

FIG. 3b shows the angular adjustment rate in °/s of a rotor blade 14. It may be initially identified from FIG. 3d that in both cases due to the form of the gust at lower wind speeds associated therewith, the pitch rate and/or angular adjustment rate are initially negative, i.e. the rotor blades are positioned into the wind, so that a greater torque may be generated. In the event of load shedding, in both cases the angular adjustment rate is set by the operational control relatively rapidly to a range of 5°/s. Smaller falls in the angular adjustment rate are based on a brief overload of the angular adjustment drives.

The rotational speed of the high speed shaft 22 generated by the gust is shown in FIG. 3c. The undulation of the rotational speed signal is based on the torsional vibration of the drive train described below. In the first uncritical case, the rotational speed increases to almost 2,200 revolutions per minute and in the more critical case (dotted line) said rotational speed increases to slightly below 2,500 revolutions per minute. For this embodiment, the second rotational speed limit is preferably set to 2,500 revolutions per minute. By increasing the trigger speed for the safety chain to 2,500 revolutions per minute, the triggering of the safety chain is avoided. Thus the loads of the wind energy installation may be markedly reduced. The conventional trigger speed for the safety chain in wind energy installations in the order of 1.5 MW and higher is, for example, at 2,400 revolutions per minute.

Figure 3E:
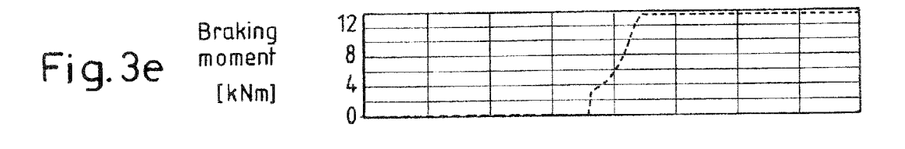
FIG. 3e shows the braking moment over the time.

In FIG. 3e the braking moment of the mechanical brake over the time is shown schematically in a diagram. It may be seen that for the first case (solid line) the mechanical brake is not activated as the first rotational speed limit is not exceeded. Only for the second case (dotted line) is the mechanical brake activated when exceeding the first rotational speed limit of 2,260 revolutions per minute and engages at approximately 11.5 seconds, and with a small time delay the mechanical brake starts to act.

Figure 3F:
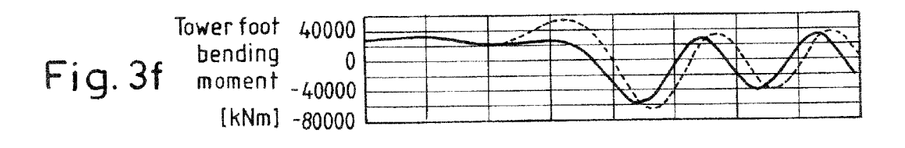
FIG. 3f shows a tower foot bending moment over the time and FIG. 3g shows the rotor torque over the time.

In FIG. 3f the tower foot bending moment is shown in kNm over the time for both cases. It may be seen clearly that the second case (dotted line) is more critical with regard to the tower foot bending moment. It may also be seen that in both cases a dampened vibration of the tower results from the gust.

Figure 3G:
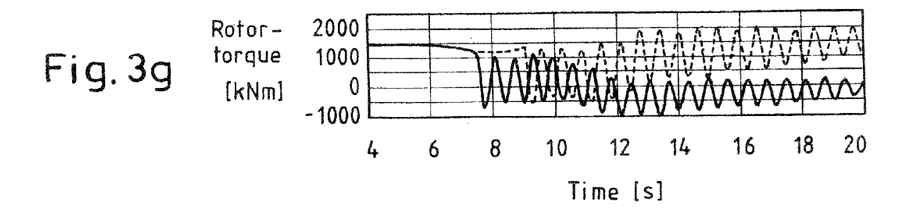

In FIG. 3g the rotor torque is shown in kNm. Similarly in this case the different cases are shown in solid and dotted lines. It may be seen that the drive train is activated by the sudden load shedding in both cases to create a strong torsional vibration, which may be compared with a prestressed torsion spring which is suddenly released. In the second (case shown in dotted lines) the displacement of the vibration by the applied mechanical brake may be seen.

Figure 4A:
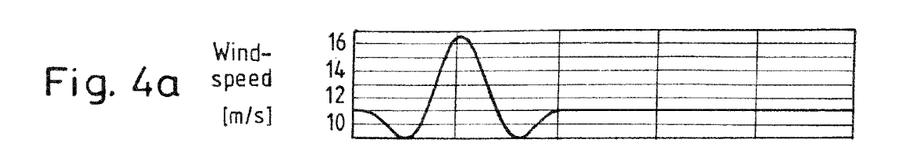
FIG. 4a shows the wind speed of a calculated gust over the time.
Figure 4B:
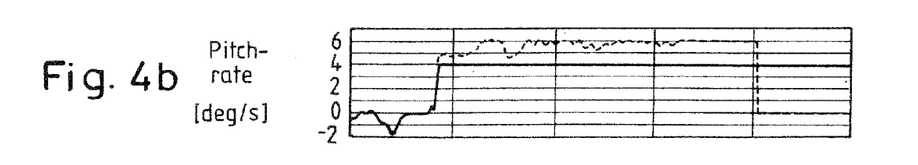
FIG. 4b shows an angular adjustment rate over the time.
Figure 4C:
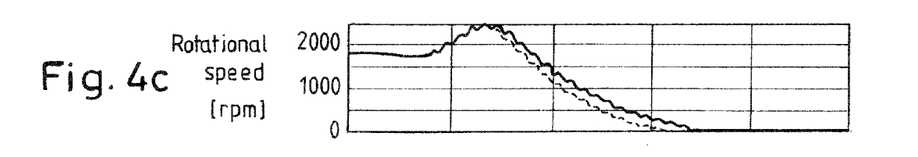
FIG. 4c shows a rotational speed over the time.
Figure 4D:
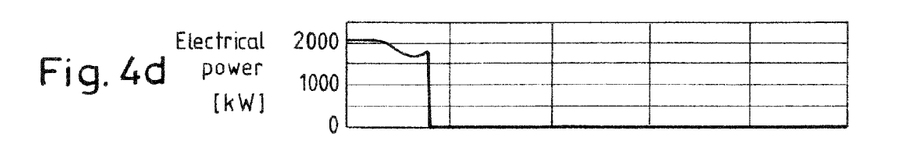
FIG. 4d shows an electrical power over the time.

In order to clarify the invention even further, in FIGS. 4a to 4g a corresponding load case of a corresponding extreme gust of wind (annual gust) is shown according to FIG. 4a in the event of load shedding by the generator according to FIG. 4d. A different embodiment of the method is shown, firstly a preferred operation of the wind energy installation according to the invention (solid lines) and secondly a slightly less preferred but inventive operational control. This has, in contrast to the prior art, already very low blade adjustment rates which have been set to very low values of 5°/s, and/or 6°/s in the event of an emergency stop.

This operational control, however, has no first rotational speed limit for triggering the brake via the operational control, but merely the triggering of the brake by the safety device at a rotational speed of 2,400 revolutions per minute. This operational control sequence, shown in dotted lines, is initially described.

According to FIG. 4d, it may be seen that the load shedding takes place approximately in the center of the rising flank of the gust of wind of FIG. 4a, i.e. in the critical range. In the less preferred embodiment, in the event of load shedding, a blade adjustment rate of 5°/s is required. When exceeding the trigger speed of 2,400 revolutions per minute (see FIG. 4c), an emergency stop is triggered by the safety device. A higher blade adjustment rate of 6°/s is required which, however, may not be maintained constant due to an angular adjustment device designed with a narrow range. At the same time, the mechanical brake is triggered so that during this operating mode a more rapid rotational speed reduction results than in the preferred embodiment shown in solid lines. Relatively high tower foot bending moments (FIG. 4f) result therefrom.

However, in the preferred embodiment according to the invention according to the solid line in FIG. 4b the blade adjustment rate is set and regulated to less than 4.6°/s, in particular to precisely 4°/s. When exceeding the first rotational speed limit (in this case 2,270 revolutions per minute) the mechanical brake engages according to FIG. 4e, i.e. slightly earlier than in the less preferred embodiment. As a result of the low blade adjustment speed, the rotor delay is less abrupt as a whole. Accordingly, according to FIG. 4f more favorable tower foot bending moments result in the preferred embodiment (solid line) in comparison with the less preferred embodiment (dotted line). The rotor torque over the time is accordingly shown in FIG. 4g. A defined increase of the drive train load may be seen, which however is acceptable in comparison with the load reduction in the tower, in particular as it refers to a very rare load case. It may also be seen that negative braking moments arise as the rotor vibrates against the brake.

The invention relates therefore to the design and operation of wind energy installations, in particular for DLC1.5 (Design Load Case for an Annual Operating Gust with Grid Failure). In a conventional operational control, tower foot bending moments of up to 100,000 kNm (including safety factors) occur. An increased aerodynamic thrust which is greater the higher and more dynamic the tower is, i.e. the lower the natural frequency of the tower is, may additionally increase the natural dynamics of the tower.

By altering the blade adjustment rate from, for example 6 to 5°/s, and increasing the trigger speed for the safety chain from 2,400 to 2,500 revolutions per minute and providing a mechanical brake power when exceeding a first speed limit of 2,200 revolutions per minute, in the exemplary installation shown, at 2 MW rated power, a reduction in the tower foot bending moments of 14% may be easily achieved. The first rotational speed limit is preferably selected such that in the event of grid failure and/or loss of the grid load, without the occurrence of a gust, the blade adjustment is sufficient in order to ensure a safe operation without a mechanical brake. This only occurs when additionally a gust of wind occurs at an unfavorable time. Increasing the first rotational speed limit, for example to 2,230 or 2,270 revolutions per minute, results only in a slightly greater tower foot bending moment in comparison with the case at 2,200 revolutions per minute, which is why said tower foot bending moment, as shown in FIG. 4, may be advantageous for simple parametering of the operational control system and/or the operational control device, for example when this rotational speed limit is already present for other operational control sequences. A further reduction in the tower foot bending moment may be achieved by the blade adjustment rate being further minimized, for example preferably to 4.5°/s or further preferably to 4°/s as shown in FIG. 4b.

Figure 4E:
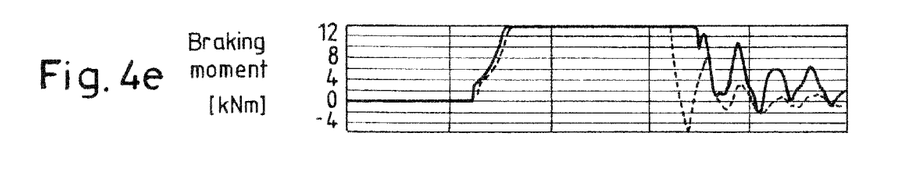
FIG. 4e shows a braking moment over the time.
Figure 4F:
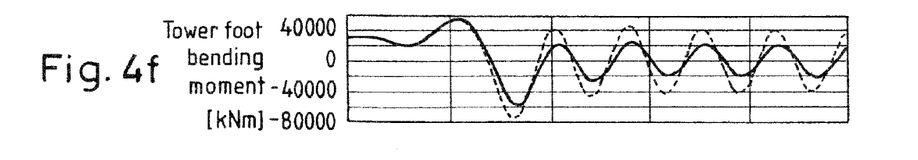
FIG. 4f shows a tower foot bending moment over the time and FIG. 4g shows a rotor torque over the time.
Figure 4G:
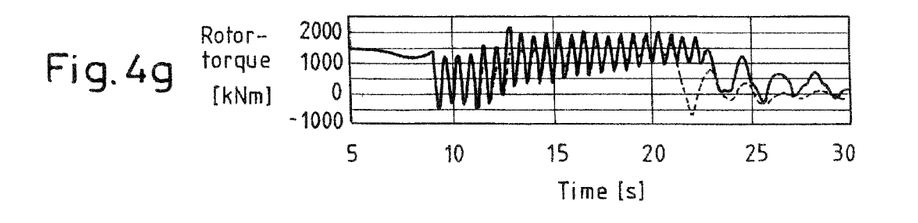

The second rotational speed limit may, in a 1.5 MW installation, be set higher than usual by the invention, for example to 2,570 revolutions per minute or even to 2,660 revolutions per minute. As a result of the invention, the mechanical brake which is shown in FIG. 4e, is actuated earlier than was previously usual. Moreover, a high blade adjustment rate, for example by using an uncontrolled adjustment, directly via a battery, is avoided. The drive train load is in this case, as may be seen in FIG. 4g, is not markedly worsened. Preferably, the method for operating the wind energy installation is only used at average wind speeds of greater than 9 m/s and less than approximately 20 m/s.

The invention has been shown above in several variants combined with one another and also in individual variants. The above disclosure may be understood by the person skilled in the art such that even the individual variants may be combined. In particular, parts or a part of the subject-matter of an inventive solution which has been reflected in a subsequent subordinate claim, and/or one or more preferred embodiments may be features of a further inventive solution in which this feature or these features are not mentioned directly in the description in connection with this solution.

LIST OF REFERENCE NUMERALS

10 Wind energy installation
11 Tower
12 Rotor
13 Rotor shaft
14 Rotor blade
15 Operational control
15' Operational control with integrated safety monitoring device
16 Safety monitoring device
17 Controller
18 Blade adjustment
19 Mechanical brake
20 Safety chain
21 Electrical components
22 High speed shaft
23 Generator (with rotor and stator)
24 Gear box
25 Grid
26 Data connection
27 Data connection
28 Angular adjustment
29 Rotational direction
30 Fault signal
31 Gust of wind

The invention claimed is:

1. Method for operating a wind energy installation (10), the wind energy installation (10) comprising a rotor (12, 13, 22), at least one rotor blade (14) with an adjustable angle, a mechanical brake device (19) for braking the rotor (14), an operational control device (15, 15') and a safety system (16, 20), comprising the following method steps:
braking of the rotor (12, 13, 22) by means of an angular adjustment (28) at an average angular adjustment rate of less than 8.5°/s of the at least one rotor blade (14) after a fault signal (30) occurs,
braking of the rotor (12, 13, 22) by means of the mechanical brake device (19) as soon as the rotational speed of the rotor (12, 13, 22) exceeds a predefinable first rotational speed limit, and
triggering of the safety system (16, 20) as soon as the rotational speed of the rotor (12, 13, 22) exceeds a predefinable second rotational speed limit, the rotor (12, 13, 22) being braked and the second rotational speed limit being higher than the first rotational speed limit, the second rotational speed limit not being exceeded when the wind energy installation (10) is operationally capable, even in the event of load shedding by the generator (23) combined with an extreme gust of wind (31), the probability of occurrence thereof being less than once in three months.

2. Method according to claim 1, wherein the second rotational speed limit is not exceeded in the event of a gust of wind (31) with a probability of occurrence of once a year.

3. Method according to claim 1, wherein the fault signal (30) includes exceeding a third rotational speed limit which is lower than the first rotational speed limit, load shedding by the generator (23), an error in the grid (25) and/or an error in the angular adjustment (28) of at least one rotor blade (16).

4. Method according to claim 1, wherein the angular adjustment rate of the at least one rotor blade (14) after the occurrence of the fault signal (30) is less than 8°/s.

5. Method according to claim 1, wherein the angular adjustment rate is controlled by a control device (15, 15') associated with the operational control device (15, 15') or a separate control device (17).

6. Method according to claim 1, wherein the angular adjustment rate of the at least one rotor blade (10) when exceeding a predefinable blade angle is altered to a lower angular adjustment rate which is less than half of the previous angular adjustment rate.

7. Method according to claim 1, wherein the first rotational speed limit is in a range of more than 15% above a rated speed of the wind energy installation (10) which in particular has a rated power of more than 1.45 MW.

8. Method according to claim 7, wherein the first rotational speed limit is between 20 and 35% above the rated speed of the wind energy installation (10).

9. Method according to claim 1, wherein the second rotational speed limit is in a range of 35% to 45% above a rated speed of the wind energy installation (10) which in particular has a rated power of more than 1.45 MW.

10. Method according to claim 1, wherein the second rotational speed limit is in a range of 5% to 20% above the first rotational speed limit of the wind energy installation (10).

11. Method according to claim 3, wherein the third rotational speed limit is in a range of 10% to 20% above a rated speed of the wind energy installation (10) which in particular has a rated power of more than 1.45 MW.

12. Method according to claim 1, wherein the braking of the rotor (12, 13, 22) by means of the mechanical brake device (19) is terminated when a fourth predefinable rotational speed limit is fallen below.

13. Method according to claim 1, wherein the braking of the rotor (12, 13, 22) by means of the mechanical brake device (19), is terminated when an average rotor blade angle exceeds a predefinable threshold value, and a predefinable time since the start of the braking of the rotor (12, 13, 22) by means of the mechanical brake device (19) is exceeded.

14. Method for operating a wind energy installation (10), the wind energy installation (10) comprising a rotor (12, 13, 22), at least one rotor blade (14) with an adjustable angle, a tower (11), an operational control device (15, 15') and a safety system (16, 20), comprising the following method steps:
  operating the wind energy installation regulated or controlled by the operational control device (15, 15') for generating electrical voltage until a fault signal (30) occurs,
  triggering of the safety system (16, 20) when the fault signal occurs, and
  subsequent braking of the rotor (12, 13, 22) by an angular adjustment (28) at an, in particular, initial, average angular adjustment rate of less than 6.5°/s of the at least one rotor blade, detected over a time period of a half, up to a whole, vibration period of the tower.

15. Method according to claim 14, wherein the average angular adjustment rate is less than 6°/s.

16. Method according to claim 14, wherein the angular adjustment rate is controlled or regulated and is further reduced with increasing enlargement of the blade angle and/or reduction of the rotational speed.

17. Method according to one of claims 14, wherein the fault signal (30) in the event of load shedding by a generator (23) is coupled to an extreme gust of wind (31), the probability of occurrence of the gust of wind (31) being less than once in three months, in particular less than once a year.

18. Wind energy installation (10) comprising:
  a rotor (12, 13, 22),
  at least one rotor blade (14) with an adjustable angle,
  a mechanical brake (19) for braking the rotor (12, 13, 22),
  an operational control device (15, 15'),
  a safety system (16, 20),
  a first brake device (18) which brakes the rotor (12, 13, 22) by means of an angular adjustment (28) of the at least one rotor blade (14) at an average angular adjustment rate of less than 8.5°/s in the presence of a fault signal (20), and
  a second brake device (19) for the mechanical braking of the rotor (12, 13, 22), as soon as the rotational speed of the rotor (12, 13, 22) exceeds a predefinable first rotational speed limit,
  wherein the safety system (16, 20) in the case in which the rotational speed of the rotor (12, 13, 22) exceeds a predefinable second rotational speed limit, is provided for braking the rotor (12, 13, 22),
  wherein the second rotational speed limit is higher than the first rotational speed limit, and
  wherein the second rotational speed limit and the wind energy installation (10) are dimensioned such that when the wind energy installation (10) is operationally capable, even in the event of load shedding by the generator (23) combined with an extreme gust of wind (31), the probability of occurrence thereof being less than once in three months, the second speed limit is not exceeded.

19. Wind energy installation (10) according to claim 18, wherein the second rotational speed limit in the event of a gust of wind (31) with a probability of occurrence of once a year is not exceeded.

20. Wind energy installation (10) according to claim 18, wherein the fault signal (30) includes exceeding a third rotational speed limit which is lower than the first rotational speed limit, load shedding by the generator (23), an error in the grid (25) and/or an error in the angular adjustment (28) of at least one rotor blade (14).

21. Wind energy installation (10) according to claim 18, wherein the angular adjustment rate of the at least one rotor blade (14) in the presence of the fault signal (30) is set less than 8°/s.

22. Wind energy installation (10) according to claim 18, wherein the angular adjustment rate is controlled by a control device (15, 15') associated with the operational control device (15, 15') or a separate control device (17).

23. Wind energy installation (10) according to claim 18, wherein the angular adjustment rate of the at least one rotor blade (14) is able to be altered, when exceeding a predefinable blade angle, to a lower angular adjustment rate, in particular to an angular adjustment rate which is less than half of the previous angular adjustment rate.

24. Wind energy installation (10), according to claim 18, wherein the first rotational speed limit is in a range of more than 15% above a rated speed of the wind energy installation (10) which in particular has a rated power of more than 1.45 MW.

25. Wind energy installation (10) according to claim 24, wherein the first rotational speed limit is between 20 and 35% above the rated speed of the wind energy installation (10).

26. Wind energy installation (10) according to claim 18, wherein the second rotational speed limit is in a range of 35% to 45% above a rated speed of the wind energy installation (10) which, in particular, has a rated power of more than 1.45 MW.

27. Wind energy installation (10) according to claim 18, wherein the second rotational speed limit is in a range of 5% to 20% above the first rotational speed limit of the wind energy installation (10).

28. Wind energy installation (10) according to claim 20, wherein the third rotational speed limit is in a range of 10% to 20%, in particular of 15% to 17%, above a rated speed of the wind energy installation (10) which, in particular, has a rated power of more than 1.45 MW.

29. Wind energy installation (10) according to claim 18, wherein the braking of the rotor (12, 13, 22) by means of the mechanical brake device (10) may be terminated when falling below a fourth predefinable rotational speed limit.

30. Wind energy installation (10) according to claim 20, wherein the braking of the rotor (12, 13, 22) by means of the mechanical brake device (19), is terminated when an average rotor blade angle exceeds a predefinable threshold value and a predefinable time since the start of the braking of the rotor (12, 13, 22) by the mechanical brake device (19) is exceeded.

31. Wind energy installation (10) comprising:
  a rotor (12, 13, 22),
  at least one rotor blade (14) with an adjustable angle, a tower (11),
an operational control device (15, 15'), and
a safety system (16, 20),
wherein the operational control device (15, 15') is provided for the regulated or controlled operation of the wind energy installation (10) for generating electrical voltage until a fault signal (30) occurs, and
wherein the safety system (16, 20) is able to be triggered with and/or after the occurrence of the fault signal and by means of the safety system (16, 20) a braking of the rotor (12, 13, 22) is produced by means of an angular adjustment (28) at an, in particular initial, average angular adjustment rate of less than 6.5°/s of the at least one rotor blade detected over a time period of a half to a whole vibration period of the tower.

32. Wind energy installation (10) according to claim 31, wherein the average angular adjustment rate is less than 6°/s.

33. Wind energy installation according to claim 31, wherein the angular adjustment rate may be controlled or regulated and may be further reduced with increasing enlargement of the blade angle and/or reduction of the rotational speed.

34. Wind energy installation (10) according claim 31, wherein the fault signal (30) in the event of load shedding by a generator (23) is coupled to an extreme gust of wind (31), the probability of occurrence of the gust of wind (31) being less than once in three months, in particular less than once a year.

35. Method for operating a wind energy installation (10), the wind energy installation (10) comprising a rotor (12, 13, 22), at least one rotor blade (14) with an adjustable angle, a mechanical brake device (19) for braking the rotor (14), an operational control device (15, 15') and a safety system (16, 20), comprising the following method steps:
braking of the rotor (12, 13, 22) by means of an angular adjustment (28) at an average angular adjustment rate of less than 8.5°/s of the at least one rotor blade (14) after a fault signal (30) occurs,
braking of the rotor (12, 13, 22) by means of the mechanical brake device (19) as soon as the rotational speed of the rotor (12, 13, 22) exceeds a predefinable first rotational speed limit, and the mechanical braking being triggered by the operational control device (15, 15'), and
triggering of the safety system (16, 20) as soon as the rotational speed of the rotor (12, 13, 22) exceeds a predefinable second rotational speed limit, the rotor (12, 13, 22) being braked and the second rotational speed limit being higher than the first rotational speed limit.

36. Wind energy installation (10) comprising:
a rotor (12, 13, 22),
at least one rotor blade (14) with an adjustable angle,
a mechanical brake (19) for braking the rotor (12, 13, 22),
an operational control device (15, 15'),
a safety system (16, 20),
a first brake device (18) which brakes the rotor (12, 13, 22) by means of an angular adjustment (28) of the at least one rotor blade (14) at an average angular adjustment rate of less than 8.5°/s in the presence of a fault signal (20), and
a second brake device (19) for the mechanical braking of the rotor (12, 13, 22), as soon as the rotational speed of the rotor (12, 13, 22) exceeds a predefinable first rotational speed limit,
wherein the second brake device (19) is able to be triggered by the operational control device (15, 15'),
wherein the safety system (16, 20) in the case in which the rotational speed of the rotor (12, 13, 22) exceeds a predefinable second rotational speed limit, is provided for braking the rotor (12, 13, 22), and
wherein the second rotational speed limit is higher than the first rotational speed limit.

\* \* \* \* \*